Patented Nov. 27, 1945

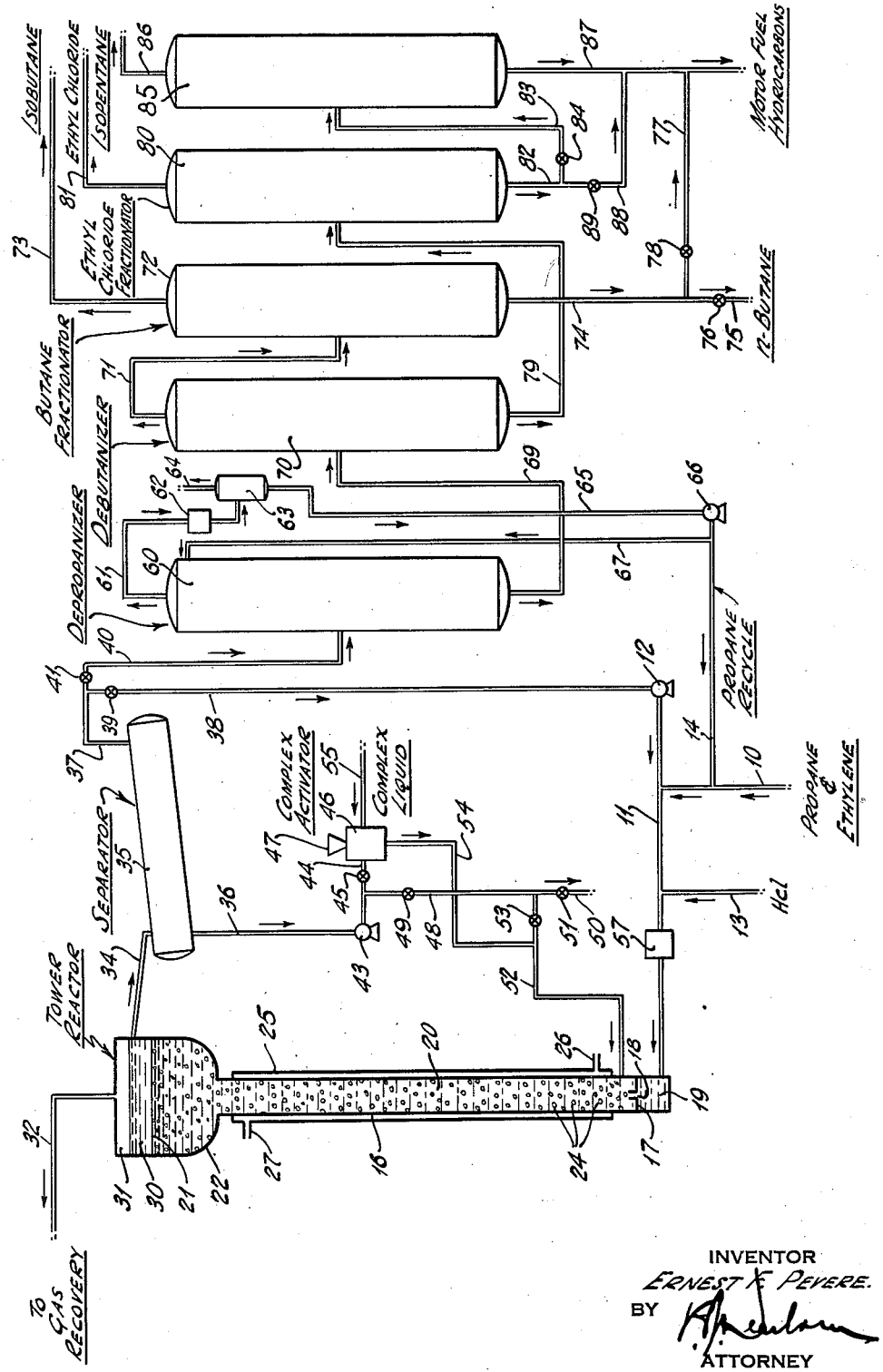

2,389,739

UNITED STATES PATENT OFFICE 2,389,739

CONVERSION OF HYDROCARBONS

Ernest F. Pevere, Beacon, N. Y., assignor to The Texas Company, New York, N. Y., a corporation of Delaware Application July 11, 1944, Serial No. 544,345

16 Claims. (Cl. 260—683.4)

This invention relates to the catalytic conversion or alkylation of propane with ethylene to produce higher molecular weight products.

One of the principal objects of the invention is to provide a method of converting propane and ethylene to more valuable products, including isobutane, isopentane, ethyl halide and motor fuel hydrocarbons.

Another object of the invention is to provide a method for the alkylation of propane in liquid phase with ethylene to produce a substantially saturated product of higher molecular weight containing substantial amounts of isobutane and isopentane.

Still another object of the invention is to provide a method for the manufacture of a low boiling isoparaffin, such as isobutane and isopentane, and the concomitant production of ethyl chloride, by the reaction of propane with ethylene in the presence of an activated aluminum chloride complex catalyst and a substantial amount of HCl.

Other objects and advantages of the present invention will be apparent from the following description when taken in conjunction with the attached drawing and appended claims.

In my Patent No. 2,349,053 dated May 16, 1944, there is disclosed and claimed a method of thermally and catalytically converting propane and ethylene to more valuable higher molecular weight products by operation at temperatures and pressures above the critical for the hydrocarbon reactants and therefore in the gas phase in the presence of an aluminum chloride catalyst. I have now discovered that propane can be made to react with ethylene in the presence of an aluminum chloride catalyst at temperatures below the critical for propane and under sufficient pressure to maintain the propane in the liquid phase. Under these conditions, good yields of a saturated product consisting largely of isobutane and isopentane with some heavier normally liquid motor fuel hydrocarbons can be obtained, provided the reaction is promoted by the use of a substantial amount of HCl. I have further discovered that this reaction can advantageously be effected in the presence of an aluminum chloride-hydrocarbon complex liquid activated by the addition of aluminum chloride, with the concomitant production of a substantial yield of ethyl chloride as a valuable by-product.

The reaction of lower molecular weight paraffins with olefins in both liquid phase and gas phase, using an aluminum chloride catalyst, has heretofore been proposed. For example, Hull et al. No. 2,196,831 suggests the reaction of a paraffin-olefin mixture containing 2–4 carbon atom hydrocarbons in both gas phase and liquid phase at temperatures from minus 50 to 500° F. in the presence of aluminum chloride and up to 1% by weight of HCl based on the hydrocarbon charge. A substantial proportion of isobutane is required in the hydrocarbon feed in this process, and the emphasis is on the isoparaffin-olefin reaction. There is no specific disclosure of the reaction of propane with ethylene; and there is no teaching of a satisfactory liquid phase catalytic method for converting a gas mixture consisting mainly of propane and ethylene and which is substantially free from isobutane. Moreover, the patent states that isobutane should be reacted with ethylene at a temperature of about 500° F. which is above the critical and is therefore in the gas phase. The teaching is plain that the lower temperature liquid phase reaction is employed for the higher molecular weight mixtures, particularly the iso-butane-butylene mixtures, which are more reactive; and the higher temperature gas phase operation is employed for the lower molecular weight mixtures such as those containing ethylene. Frey et al. No. 2,233,363 discloses the reaction of gas mixtures containing propane and ethylene, but here again temperatures above the critical are employed.

The present invention is distinguished by the specific reaction of propane with ethylene at temperatures below 200° F. with sufficient pressure so that propane is maintained in liquid phase, and by the use of a high proportion of hydrogen halide of about 2–25% by weight based on the hydrocarbon charge.

It has been heretofore recognized in this art that propane is particularly inert in catalytic alkylation at temperatures below the critical temperature thereof; and attempts to react propane with a normally gaseous olefin have resorted to higher temperatures above the critical and particularly to conditions conducive to so-called thermal alkylation wherein cracking takes place. While isoparaffins react readily with olefins in the presence of a suitable alkylation catalyst, normal paraffins of the character of normal butane and higher molecular weight straight chain paraffins have been alkylated with olefins only in the presence of certain highly reactive catalysts at the lower temperature conditions of catalytic alkylation. The fact that propane can be made to react with a normally gaseous olefin, such as ethylene, under lower temperature liquid phase conditions of the present invention is all the more astounding since this particular normal paraffin has proved resistant to reaction in the presence of catalysts heretofore found effective for the alkylation of normal butane and higher molecular weight normal paraffins. In addition, the liquid phase operating conditions of the present invention are conducive to increased yields of higher quality products together with improved catalyst life.

In accordance with the present invention, propane is reacted with ethylene, using a substantial molar excess of propane to ethylene, in the presence of an aluminum halide catalyst, such as aluminum chloride, and about 2-25% by weight of a hydrogen halide, such as HCl, based on the hydrocarbon charge at a temperature of about 150-200° F. and under sufficient pressure to maintain propane in the liquid phase. While pure propane and ethylene can be employed, it is generally preferred to utilize a hydrocarbon mixture obtained from refinery fractions which consist mainly of propane and ethylene. For example, the charge can include inert gaseous constituents, such as ethane, methane and hydrogen, and a small amount of propylene may also be present. Large quantities of propane and ethylene are available at most refineries and the present process is particularly suitable for the conversion of these gases to more valuable products.

The use of a substantial molar excess of propane to ethylene reduces the tendency toward ethylene polymerization and other objectionable side reactions. For example, a molar ratio of propane to ethylene of about 5:1 to 30:1, and preferably about 8:1 to 15:1, is generally employed. Temperatures below the critical of 203° F. for propane are used, and are generally above about 150° F. for satisfactory yields in continuous operation. Preferably, a temperature range of about 175-190° F. is employed. Pressures of about 500-6,000 pounds per square inch are utilized, depending upon the temperature and character of the hydrocarbon feed in order to maintain the propane in liquid phase. Preferably, pressures of about 800-1500 pounds per square inch are employed. A time of contact of about 5-60 minutes or more, and preferably about 20-40 minutes is employed.

The aluminum halide catalyst may be in lump or powder form, or may be impregnated on or supported by suitable contact material, such as activated alumina, bauxite, quartz and the like. The catalyst may be suspended in the reacting hydrocarbons, or may be mounted in solid form in a reaction tower or chamber. A very satisfactory form of the catalyst, particularly for the concomitant production of ethyl halide, comprises an aluminum halide-hydrocarbon complex liquid activated by the addition of aluminum halide of the character disclosed and claimed in the copending application of Louis A. Clarke, Serial No. 515,649, filed December 27, 1943. The complex liquid is prepared by directly reacting an aluminum halide, such as aluminum chloride, with paraffin or olefin hydrocarbons or suitable alkyl halides, such as propyl and butyl chlorides. Very satisfactory liquid complexes are obtained by heating aluminum chloride with kerosene or other higher boiling petroleum fractions, such as a higher boiling naphtha or gas oil. Also, very suitable complex liquids are prepared by reacting aluminum chloride with tertiary butyl chloride and separating the supernatant liquid product. Other aluminum chloride-hydrocarbon complexes can be employed, such as the by-product liquids resulting from conventional alkylation or isomerization operations with aluminum chloride.

To the body of preformed aluminum halide-hydrocarbon complex liquid is added additional aluminum halide to form the so-called activated complex catalyst. This consists of the complex liquid containing suspended and/or dissolved aluminum halide in active form. When utilizing this activated complex catalyst, it appears that mainly the active dispersed aluminum halide is consumed; and the activity of the catalyst in continuous operation is maintained by adding additional fresh aluminum halide to the originally prepared activated complex catalyst, either continuously or intermittently. It has been found that by maintaining the proportion of complex liquid to added active dispersed aluminum halide relatively large, it is possible to maintain the catalyst in an active and effective form for a long period of continuous operation by the addition of a relatively small amount of fresh aluminum halide, with resulting economy in the consumption of aluminum halide. A large body of the activated complex catalyst relative to the total hydrocarbons maintained at any one time in the reaction zone can thereby be economically used for best results. This provides highly effective contact between the dispersed active aluminum halide and the reacting hydrocarbons. Generally, solid aluminum chloride in particle form is initially added to the preformed complex liquid in the proportion of about 25-300 grams of aluminum chloride to about 600 cc. of the complex liquid to form the activated catalyst that is charged to the system. This catalyst has a heat of hydrolysis in excess of about 320 calories per gram of activated complex liquid.

An important feature of the present invention resides in the use of a high proportion of hydrogen halide, such as HCl. For example, when the concentration of HCl is less than about 2% by weight based on the hydrocarbon charge, the yield of desired product from this propane-ethylene reaction of the present invention drops to an unsatisfactory level. Generally, the proportion of HCl is about 2-25% by weight based on the hydrocarbon charge, and preferably about 4-15%. Where the object is to produce a high yield of ethyl chloride as a valuable by-product, proportions of HCl within the upper part of the range may be employed, such that the HCl bears a molar ratio to the ethylene of the charge of about 0.5:1 to 1:1. The HCl is advantageously introduced along with the hydrocarbon feed. If desired, the propane feed can be split, the major proportion being initially mixed with the ethylene for introduction in mixed phase to the reaction zone, and the balance of the propane mixed with the HCl for carrying the latter into the reaction zone.

The process can be carried out batch-wise or continuously. In batch operation, the aluminum chloride catalyst may be charged to the agitated reactor together with a portion of the propane if desired, and then a mixed propane-ethylene feed containing HCl introduced into the reactor with agitation.

However, the operation is preferably carried out in a continuous manner. For this purpose any of the conventional types of alkylation reactors which are constructed to withstand the high pressures employed can be used. For example, a rotary reactor connected to a vertical settler having a large return line for settled catalyst, can be satisfactorily employed, particularly with the activated complex catalyst. A packed-tower type of reactor containing a fixed bed of solid aluminum chloride may also be used, with continuous hydrocarbon feed and withdrawal.

Preferably, a tower type of reactor is used with the activated complex catalyst, this reactor being of the character disclosed and claimed in the copending application of Louis A. Clarke, Serial No. 470,043, filed December 24, 1942. In this reactor, a large liquid body of the activated complex catalyst is maintained as the continuous phase in a tower of substantial height; and the hydrocarbon feed together with HCl is dispersed in the form of small drops into the lower portion of the catalyst liquid, the drops then rising through the continuous catalyst phase due to difference in gravity and coalescing to form a superposed hydrocarbon liquid layer on the upper surface thereof. Unreacted gas can be withdrawn from a gas space above the hydrocarbon layer; and a stream of the hydrocarbon layer is withdrawn by suitable overflow to a settler or separator where any retained catalyst liquid immediately separates. The hydrocarbon liquid free from catalyst is then preferably divided, the major proportion being recycled for mixing with the fresh hydrocarbon feed and the mixture dispersed into the bottom of the tower, while a minor proportion is withdrawn for recovery of the desired products.

When aluminum chloride is employed as the catalyst, the reaction product consists mainly of isobutane and isopentane together with some higher boiling normally liquid hydrocarbons, mainly isoparaffinic in character and of high anti-knock value suitable for motor fuel. When the activated complex liquid is employed as the catalyst, the reaction product contains in addition a substantial amount of ethyl chloride which can be separately recovered.

The stream of reaction products, which is passed from the separator to recovery, is neutralized and washed in conventional manner, and then passed to a depropanizer for separation of unconverted propane for recycling. The reactor pressure is maintained on the product stream up to the depropanizer. Following removal of the unconverted propane, the products are further fractionated to recover isobutane, ethyl chloride, isopentane and motor fuel hydrocarbons.

By way of example, a preferred embodiment of apparatus for carrying out the method of the present invention is illustrated in the attached drawing. As shown, a stream of the hydrocarbon fraction consisting mainly of propane and ethylene is introduced by line 10 into hydrocarbon recycle line 11 containing recycle pump 12. The required amount of HCl is introduced by line 13 into the previously formed mixture. Sufficient pressure is imposed on these lines to maintain propane in the liquid phase; and the turbulent flow with resultant mixing action in recycle line 11 effectively disperses and dissolves gaseous ethylene and HCl in the substantial amount of liquid including feed propane from line 10, recycle propane from line 14 and product recycle from line 11. The feed and recycle propane is sufficient to maintain the described high molar ratio of propane to ethylene in the hydrocarbon charge.

Line 11 introduces this mixed feed into the base of a tower 16 having a partition 17 containing a centrally arranged dispersing orifice 18. A space 19 is thus provided in the base of the tower for the feed. The space above partition 17 contains the maintained body of activated complex liquid indicated by 20. This complex liquid extends as the continuous phase through the height of the tower up to the lever indicated at 21. The upper end of the tower is preferably enlarged as indicated at 22 to form a chamber of substantially greater cross-sectional area than the tower proper.

The mixed feed passes through orifice 18 in the form of a multitude of small drops 24, which are thus dispersed into the continuous catalyst phase with insufficient agitation to produce an emulsion. The said drops then rise through the body of catalyst liquid due to difference in gravity therebetween. Tower 16 is preferably provided with an external jacket 25 equipped with inlet 26 and outlet 27 for a suitable heating medium, such as hot water or steam, to maintain the required temperature within the reaction zone. As the said drops progress upwardly through the catalyst liquid, a reaction takes place, probably at the interface between each drop and the catalyst liquid, resulting in conversion or alkylation of propane with ethylene with the production of higher molecular weight hydrocarbons mainly isoparaffinic in character, and the concomitant reaction between a portion of the ethylene and the HCl with the formation of ethyl chloride.

As the drops reach the upper surface 21 of the catalyst liquid, the liquid portion thereof coalesces to form the superposed hydrocarbon layer 30; and any unconverted gas accumulates in the upper gas space 31 from which it is withdrawn by gas line 32 to suitable gas recovery or other disposal.

A stream of the hydrocarbon layer, which also contains some ethyl chloride, is withdrawn by overflow 34 to separator 35. It should be pointed out that the level of the catalyst liquid initially supplied to tower 16 will be below that indicated by numeral 21; but, as the feed is dispersed into the catalyst liquid upon starting operation, the level gradually rises depending upon the quantity of dispersed droplets present in the catalyst body at any one time. The rate of feed can be regulated to bring interface 21 to the level of overflow 34, so that a relatively smaller amount of catalyst liquid overflows along with the product liquid to separator 35. The catalyst liquid rapidly drops out in separator 35 and is removed by bottom line 36. Product liquid free from catalyst overflows from separator 35 by line 37 and is divided, the major proportion passing by line 38 under the control of valve 39 to recycle pump 12 for return by line 11, and a minor proportion passing by line 40 under the control of valve 41 for the recovery of product therefrom.

In actual practice, tower 16 may be from about 10 to 30 feet or more in height. Where a single dispersing orifice 18 is employed, the tower will ordinarily have an internal diameter of less than about 12 inches and preferably about 2-3 inches. However, it is to be understood that larger diameter towers can be employed utilizing a dispersing plate having a plurality of spaced orifices, so that the drops are more or less uniformly distributed throughout the cross-section of the tower. Each dispersing orifice 18 will have a diameter of about $\frac{1}{16}-\frac{1}{2}$ inch and preferably about $\frac{1}{8}-\frac{1}{4}$ inch, and the pressure within chamber 19 is sufficient to overcome the static head of the liquid catalyst body so that the feed is dispersed rather rapidly into the catalyst liquid in the form of a multitude of fine drops, each having a diameter of less than about ¼ inch, while the catalyst liquid is prevented from flowing through the orifice into chamber 19. With this construction, the rate of feed can be utilized to regulate the interface level 21 so that a small amount of the catalyst liquid will continuously or intermittently overflow through 34.

In order to maintain the activity of the catalyst liquid within the reaction zone, the portion overflowing by line 34 and discharged from separator 35 by line 36, is preferably divided.

As shown, a small catalyst pump 43 forces a portion of the liquid through line 44 under the control of valve 45 to an activating chamber 46 containing lump aluminum chloride supplied by a hopper feed 47. The said pump 43 forces another portion of the complex liquid through a by-pass line 48 under the control of valve 49. A portion of the liquid from line 48 may be discharged from the system by line 50 controlled by valve 51 while the balance passes to line 52 controlled by valve 53. The portion of the complex liquid passing to activating tank 46 takes up aluminum chloride in its flow therethrough, this activated liquid then passing by line 54 to line 52 beyond valve 53. By regulating the proportion of liquid passed to the activating tank and the proportion by-passed around that tank, the degree of activity of the complex catalyst liquid within tower 16 may be readily controlled. Line 52 introduces recycle catalyst directly into the catalyst space of the tower above partition 17 and below the jacket 25. Makeup complex liquid may be supplied to the system by line 55 which opens into the activating tank 46. In continuous operation, makeup complex liquid is formed in situ in the tower; and it is generally only necessary to supply complex liquid through line 55 when starting up operation of the plant.

As set forth above, the major proportion of the hydrocarbon liquid removed from separator 35 by line 37 is preferably recycled by line 38 to the reaction tower. While a oncethrough flow without hydrocarbon recycle can be employed, the operation described involving hydrocarbon recycle is preferred from the standpoint of increasing the propane to ethylene mol ratio in the reaction zone and also increasing the liquid to gas ratio in feed line 11. A volume ratio of hydrocarbon recycle to fresh feed of the order of about 5:1 to 50:1 and higher can be employed, with ratios of around 15:1 to 30:1 being preferred. Preferably line 11 contains a baffled mixer 57 beyond the HCl line 13 to insure adequate mixing of the liquid and gas feeds with the hydrocarbon recycle liquid prior to introduction of the mixture into the tower.

The proportion of hydrocarbon passed to line 40 is subjected to caustic neutralization and water washing (not shown) in conventional manner, and is then introduced into a depropanizer 60. The latter is operated to remove C₃ and any lighter overhead by line 61 containing a condenser 62 and discharging into an accumulator 63. Any uncondensed vapor may be released from accumulator 63 by line 64 and liquid condensate is withdrawn by line 65 and reflux pump 66 and returned in part by reflux line 67 to depropanizer 60, the balance being recycled by line 14 to the hydrocarbon feed line 10.

Depropanized liquid from tower 60 is supplied by line 69 to a debutanizer 70 which is operated to remove C₄ overhead by line 71. This overhead is passed to a butane fractionator 72 which serves to separate an isobutane-rich fraction from a normal butane fraction. The isobutane fraction is removed overhead by line 73 to suitable condensation and storage to provide makeup isobutane for C₄ or C₄–C₅ alkylation. The normal butane fraction is removed by bottom line 74 and may be discharged by line 75 controlled by valve 76 to storage for use as isomerization charge stock or motor fuel blending stock. If desired, all or a portion of the normal butane may be passed by line 77 under control of valve 78 to serve as blending stock and adjust the volatility of other motor fuel hydrocarbons produced in the present process.

The debutanized liquid bottoms from tower 70 are supplied by line 79 to an ethyl chloride fractionator 80 from which ethyl chloride is removed overhead by line 81 and passed to suitable storage as a valuable by-product. The bottoms from tower 80 are discharged by line 82, and may be passed by line 83 under control of valve 84 to a deisopentanizer 85, from which isopentane is removed overhead by line 86 and passed to suitable storage for use as an aviation fuel blending stock. Liquid bottoms from tower 85, consisting mainly of C₆ and heavier isoparaffinic hydrocarbons, are discharged by line 87 to storage as motor fuel stock, and may be mixed with normal butane from line 77 as previously described. If desired, the bottoms from tower 80 can be passed directly by line 88 under the control of valve 89 to storage as motor fuel stock, where separation of isopentane for aviation fuel is not required.

The following examples are given to illustrate the present invention, it being understood that the invention is not limited thereto.

*Example I*

One hundred grams of powdered anhydrous AlCl₃, 18 grams of anhydrous HCl and 300 grams of propane were charged to a reactor bomb equipped with agitating and heating means. The temperature of the reactor bomb was raised to between 175 and 190° F. and was maintained within these limits while ethylene was added intermittently over a 90-minute interval. The bomb was shaken during the ethylene addition and shaking was continued 10 minutes after the ethylene charge had been terminated. The pressure on the reactor bomb was between 4600 and 5300 pounds per square inch during the operation. The reactor bomb was then rapidly cooled by immersing in cold water, and the reacted mix was stabilized to remove any unreacted ethylene and propane. The resulting depropanized product was analyzed with the following results:

|  | Weight per cent |
|---|---|
| Unsaturation | Less than 1 |
| Isobutane | 49.9 |
| Normal butane | 28.5 |
| Isopentane | 15.5 |
| Normal pentane | 6.1 |

It will be noted that in this batch operation, the reaction product was composed essentially of C₄ and C₅ saturated hydrocarbons, of which approximately two-thirds by weight were isobutane and isopentane.

*Example II*

An aluminum chloride-kerosene complex liquid was prepared by heating one gallon of kerosene to 220–240° F. in a mixer equipped with a stirring device, and 400 grams of aluminum chloride were introduced and reacted over a period of several hours in the presence of about 3% by weight of added HCl. The reaction products were then allowed to stratify and any supernatant unreacted kerosene layer removed. Also, any unreacted aluminum chloride or solid sludge was separated from the mobile liquid complex by decanting the latter therefrom. The activated complex catalyst was then prepared by adding 200 grams of AlCl₃ powder to 1080 grams of the liquid complex.

A continuous run was carried out by adding this activated complex catalyst to an inverted three-liter Adkins type bomb which served as the reaction chamber, the bomb being equipped with a control valve for the take-off which led to a product receiver. The free space above and around the catalyst in the reaction chamber was filled with liquid propane. The bomb was then heated to raise the temperature to about 180° F., and during this period the pressure was maintained at about 1,000 pounds per square inch by bleeding off propane. On attaining the desired temperature, the charge was pumped in at approximately 0.4 pound per hour while the temperature and pressure of the reaction chamber were maintained at the figures given above, and the reaction chamber was agitated. The composition of the charge was:

|   | Weight per cent |
|---|---|
| Propane | 89.9 |
| Ethylene | 5.6 |
| HCl | 4.5 |

The run was continued for a substantial period, and samples accumulating in the receiver were removed from time to time, stabilized and analyzed. The following tabulation lists the conditions of the run and the results and composition of the product obtained in a typical period of the run:

| | |
|---|---|
| Propane/ethylene mol ratio | 10.4 |
| HCl _____ weight per cent | 4.5 |
| Temperature _____ °F | 182 |
| Pressure _____ pounds per square inch | 1,000 |
| Reacted mix recovered in grams | 135 |
| Yield of C₄ plus basis ethylene charged _____ weight per cent | 172 |
| Product composition C₄ plus, weight per cent: | |
|    Isobutane | 14.8 |
|    Normal butane | 7.0 |
|    Ethyl chloride | 8.9 |
|    Isopentane | 28.4 |
|    Normal pentane | 2.2 |
|    C₆ plus | 38.7 |

It will be noted that in this continuous run with the activated complex catalyst, a substantial yield of ethyl chloride was obtained. The C₄ and C₅ hydrocarbon content was saturated and consisted of about four-fifths by weight of isobutane and isopentane. An appreciable yield of C₆ and heavier motor fuel hydrocarbons, mainly isoparaffinic in character, also was obtained.

*Example III*

The following comparative continuous runs were made to compare the effect of the activated complex catalyst with a fixed bed lump aluminum chloride catalyst. These runs were carried out in a steel tower 12 feet in height and having an internal diameter of one inch. In the fixed bed operation the tower was packed with lump aluminum chloride substantially throughout its height, and the charge was passed continuously through the tower with upflow through the fixed bed and overflow to a receiver, from which hydrocarbon was withdrawn and recycled to the tower.

In the activated liquid complex operation, the tower was substantially filled with aluminum chloride-kerosene complex liquid activated by the addition of aluminum chloride powder in the manner previously described in Example II. The charge was then dispersed through an orifice at the base of the tower in droplet form into the catalyst liquid, and passed upwardly through the substantial height of catalyst liquid in the continuous phase due to difference in gravity therebetween, as described above in connection with the drawing. The liquid hydrocarbon coalesced to form an upper liquid layer on the surface of the catalyst liquid, which layer overflowed to a separator from which hydrocarbon was recycled to the reaction zone.

In both of these runs, the fresh feed was charged from two cylinders at a controlled rate by proportioning pumps, one cylinder containing part of the propane and all of the ethylene, while the other cylinder contained the remainder of the propane and all of the HCl. The feed rates, hydrocarbon recycle rates and other conditions of the runs were regulated to be substantially the same, so that the two runs would be comparative. The following table lists the conditions used and the results obtained in these runs:

| | AlCl₃-kerosene complex plus AlCl₃ powder | Lump AlCl₃ |
|---|---|---|
| Temperature _____ °F | 175 | 175 |
| Pressure _____ pounds per sq. in. | 850 | 850 |
| Propane/ethylene mol ratio | 10 | 10 |
| HCl weight percent on hydrocarbon charge | 2 | 2 |
| Hydrocarbon recycle/fresh feed volume ratio | 20 | 20 |
| Product yield of C₄ plus basis ethylene charged _____ weight percent | 116 | 69 |
| C₄ plus product composition, weight percent: | | |
|    Isobutane | 21.2 | 24.3 |
|    Normal butane | 8.5 | 4.6 |
|    Ethyl chloride | 35.0 | 0 |
|    Isopentane | 10.7 | 20.4 |
|    Normal pentane and heavier | 24.6 | 50.7 |
| Ethylene converted to ethyl chloride weight percent | 19.2 | 0 |

The comparatively low yields, based on ethylene charged, obtained in these runs indicate that the proportion of HCl employed on the basis of the hydrocarbon feed is critical in this reaction, and that the 2% by weight of HCl used was approximately the lower limit for this liquid phase operation. These comparative runs confirmed the fact that ethyl chloride is formed in the presence of the activated complex catalyst, but not in the presence of the straight aluminum chloride catalyst.

*Example IV*

The following essentially comparative runs were carried out with a fixed bed lump aluminum chloride catalyst in the tower reactor of Example III to illustrate the effect of HCl concentration on this reaction. The conditions used and the results obtained in these runs are listed in the following table:

| | Low HCl concentration | Higher HCl concentration |
|---|---|---|
| Temperature _____ °F | 175 | 185 |
| Pressure _____ pounds per square inch | 850 | 850 |
| Propane/ethylene mol ratio | 10 | 10 |
| HCl weight percent based on hydrocarbon charge | 2 | 10 |
| Hydrocarbon recycle/fresh feed volume ratio | 20 | 20 |
| C₄ plus product yield basis ethylene charged _____ weight percent | 60 | 197 |
| C₄ plus product composition, weight percent: | | |
|    Isobutane | 24.1 | 39.1 |
|    Normal butane | 7.9 | 24.6 |
|    Ethyl chloride | 0 | 0 |
|    Isopentane | 20.0 | 20.7 |
|    Normal pentane and heavier | 48.0 | 15.5 |

It is to be noted that the higher HCl concentration not only increased the yield more than three fold, but also improved the product by giving higher yields of isobutane and isopentane suitable for the manufacture of aviation gasoline, while reducing the yield of the normal pentane and heavier motor fuel hydrocarbons.

It is contemplated that catalyst life in this reaction may be further improved by the use of an inhibitor of catalyst deterioration, such as hydrogen and naphthene hydrocarbons of the character of cyclohexane and cyclopentane. For example, the reaction may be carried out in the presence of a substantial pressure of added hydrogen, such as about 50–5,000 pounds per square inch, and preferably about 500–1,500 pounds per square inch. Likewise, a normally liquid naphthene hydrocarbon such as cyclohexane may be added to the charge in the proportion of about 1–10% and preferably about 2–5%.

Obviously many modifications and variations of the invention, as hereinbefore set forth, may be made without departing from the spirit and scope thereof, and therefore only such limitations should be imposed as are indicated in the appended claims.

I claim:

1. The process which comprises reacting a hydrocarbon mixture consisting mainly of propane and ethylene with the propane in substantial molar excess of the ethylene in the presence of an aluminum halide catalyst and about 2–25% by weight of a hydrogen halide based on the hydrocarbon charge at a temperature of about 150–200° F. and under sufficient pressure to maintain propane in the liquid phase, and recovering from the reaction products a substantially saturated material containing C₄ and heavier hydrocarbons and including substantial proportions of isobutane and isopentane.

2. Process according to claim 1, wherein the catalyst is aluminum chloride, the temperature is about 175–190° F. and the hydrogen halide is HCl in a concentration of about 4–15% by weight.

3. Process according to claim 1, wherein the catalyst is an aluminum chloride-hydrocarbon complex liquid activated by the addition of aluminum chloride; and the hydrogen halide is HCl.

4. The process which comprises reacting a hydrocarbon mixture consisting mainly of propane and ethylene with the propane in substantial molar excess of the ethylene in the presence of a liquid body of aluminum chloride-hydrocarbon complex containing added aluminum chloride and about 2–25% by weight of HCl based on the hydrocarbon charge at a temperature of about 150–200° F. and under sufficient pressure to maintain propane in the liquid phase, recovering from the reaction products a substantially saturated material containing C₄ and heavier hydrocarbons and ethyl chloride, said C₄ and heavier hydrocarbons including substantial proportions of isobutane and isopentane, and separating the ethyl chloride from said material.

5. Process according to claim 4, wherein the catalyst is maintained as a liquid body of substantial height in the continuous phase in the reaction zone, the hydrocarbon mixture together with the HCl is dispersed in the form of small drops into the continuous catalyst phase, the drops rising upwardly through the catalyst body due to difference in gravity therebetween and coalescing upon reaching the upper surface thereof to form a superposed hydrocarbon layer, and a stream of the superposed hydrocarbon layer is withdrawn for the recovery of the said substantially saturated material.

6. Process according to claim 4, wherein the catalyst is maintained as a liquid body of substantial height in the continuous phase in the reaction zone, the hydrocarbon mixture together with the HCl is dispersed in the form of small drops into the continuous catalyst phase, the drops rising upwardly through the catalyst body due to difference in gravity therebetween and coalescing upon reaching the upper surface thereof to form a superposed hydrocarbon layer, a stream of the superposed hydrocarbon layer is withdrawn and divided, a major proportion of the latter being recycled and mixed with the hydrocarbon feed mixture and HCl for redispersion into the reaction zone to provide a hydrocarbon recycle to feed ratio of about 5–50:1, and a minor proportion of the withdrawn stream of the superposed hydrocarbon layer is passed to recovery.

7. The method of manufacturing ethyl chloride which comprises reacting a hydrocarbon charge consisting mainly of propane and ethylene, and having a substantial molar excess of propane to ethylene in excess of about 5:1, with about 2–25% by weight of HCl based on the hydrocarbon charge in the presence of a substantial liquid body of catalyst consisting of an aluminum chloride-hydrocarbon complex liquid containing added aluminum chloride at a temperature of 150–200° F. and under sufficient pressure to maintain propane in the liquid phase, and separately recovering ethyl chloride from the reaction products.

8. The method of manufacturing isobutane which comprises reacting a substantial molar excess of propane with ethylene in the presence of an aluminum chloride catalyst and about 4–15% by weight of HCl based on the hydrocarbon charge at a temperature of 150–200° F. and under sufficient pressure to maintain propane in the liquid phase, and separately recovering isobutane from the reaction products.

9. The method of manufacturing isopentane which comprises reacting a substantial molar excess of propane with ethylene in the presence of an aluminum chloride catalyst and about 4–15% by weight of HCl based on the hydrocarbon charge at a temperature of 150–200° F. and under sufficient pressure to maintain propane in the liquid phase, and separately recovering isopentane from the reaction products.

10. The method of manufacturing a low-boiling isoparaffin selected from the group consisting of isobutane and isopentane and concomitantly producing ethyl chloride which comprises reacting a substantial molar excess of propane with ethylene and about 5–25% by weight of HCl based on the hydrocarbon charge in the presence of an aluminum chloride-hydrocarbon complex liquid containing added aluminum chloride at a temperature of 150–200° F. and under sufficient pressure to maintain propane in the liquid phase, and separately recovering the low-boiling isoparaffin and ethyl chloride from the reaction products.

11. The method of manufacturing normally liquid motor fuel hydrocarbons of high antiknock value and concomitantly producing isobutane which comprises reacting a substantial molar excess of propane with ethylene and about 2–25% by weight of a hydrogen halide based on the hydrocarbon charge in the presence of an aluminum halide catalyst at a temperature of 150–200° F. and under sufficient pressure to maintain propane in the liquid phase, and separately recovering isobutane and normally liquid motor fuel hydrocarbons from the reaction products.

12. The method of manufacturing normally liquid motor fuel hydrocarbons of high anti-knock value and concomitantly producing isobutane and ethyl halide, which comprises reacting a substantial molar excess of propane with ethylene and about 5-25% by weight of a hydrogen halide based on the hydrocarbon charge in the presence of an aluminum halide-hydrocarbon complex liquid containing added aluminum halide at a temperature of 150-200° F. and under sufficient pressure to maintain propane in the liquid phase, and separately recovering isobutane, ethyl halide, and normally liquid motor fuel hydrocarbons from the reaction products.

13. The method of manufacturing an ethyl halide which comprises reacting a hydrocarbon charge consisting mainly of propane and ethylene, and having a substantial molar excess of propane to ethylene in excess of about 5:1, with about 5-25% by weight of a hydrogen halide based on the hydrocarbon charge in the presence of a substantial liquid body of catalyst consisting of an aluminum halide-hydrocarbon complex liquid containing added aluminum halide at a temperature of 150-200° F. and under sufficient pressure to maintain propane in the liquid phase.

14. The method in the manufacture of higher molecular weight hydrocarbons from propane and ethylene, which comprises reacting a substantial molar excess of propane with ethylene and 2-25% by weight of a hydrogen halide based on the hydrocarbon charge in the presence of an aluminum halide catalyst at temperatures of about 150-200° F. and under sufficient pressure to maintain propane in the liquid phase, the reaction being carried out in the presence of an added inhibitor of catalyst deterioration.

15. The method according to claim 14, wherein the added inhibitor of catalyst deterioration comprises a substantial pressure of added hydrogen.

16. The method according to claim 14, wherein the inhibitor of catalyst deterioration comprises an added normally liquid naphthene hydrocarbon.

ERNEST F. PEVERE.